US009716690B2

(12) United States Patent
Xie et al.

(10) Patent No.: US 9,716,690 B2
(45) Date of Patent: *Jul. 25, 2017

(54) INTEGRATED SECURITY SWITCH

(71) Applicant: Fortinet, Inc., Sunnyvale, CA (US)

(72) Inventors: Michael Xie, Menlo Park, CA (US); Jin Shang, Newark, CA (US); Anthony James, San Jose, CA (US); Shaohong Wei, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/862,682

(22) Filed: Sep. 23, 2015

(65) Prior Publication Data

US 2016/0014090 A1 Jan. 14, 2016

Related U.S. Application Data

(63) Continuation of application No. 13/968,108, filed on Aug. 15, 2013, now Pat. No. 9,225,683, which is a continuation of application No. 12/539,801, filed on Aug. 12, 2009, now Pat. No. 8,588,226, which is a continuation of application No. 11/347,279, filed on Feb. 6, 2006, now Pat. No. 7,606,225.

(51) Int. Cl.
*H04L 12/28* (2006.01)
*H04L 29/06* (2006.01)
*H04L 12/813* (2013.01)

(52) U.S. Cl.
CPC .......... *H04L 63/0281* (2013.01); *H04L 47/20* (2013.01); *H04L 63/02* (2013.01); *H04L 63/0209* (2013.01)

(58) Field of Classification Search
USPC ................ 370/229–352, 389–395, 401–466; 709/221–229; 726/11–23
See application file for complete search history.

(56) References Cited

U.S. PATENT DOCUMENTS

| | | | | |
|---|---|---|---|---|
| 5,751,967 A | * | 5/1998 | Raab | H04L 41/12 709/220 |
| 6,170,012 B1 | * | 1/2001 | Coss | H04L 29/06 709/225 |
| 6,356,551 B1 | * | 3/2002 | Egbert | G06F 13/1605 370/389 |
| 6,496,935 B1 | * | 12/2002 | Fink | H04L 63/0254 370/451 |

(Continued)

*Primary Examiner* — Man Phan
(74) *Attorney, Agent, or Firm* — Law Office of Dorian Cartwright; Dorian Cartwright

(57) ABSTRACT

An integrated security switch and related method for managing connectivity and security among networks. The integrated security switch includes a security function connectable with a first network and at least one switching function connectable with a second network. A common management interface driven by both command line interface and graphic user interface protocols manages the switching function via a management path dedicated between the security function and the switching function. The common management interface enables secure switching of traffic to flow via a traffic path dedicated between the switching function and the security function. Typically, the traffic is a flow of data between the Internet and a group of networked users such as a wide area network.

11 Claims, 3 Drawing Sheets

(56) References Cited

U.S. PATENT DOCUMENTS

| | | | |
|---|---|---|---|
| 6,714,544 B1 | 3/2004 | Bosloy et al. | |
| 6,856,591 B1 * | 2/2005 | Ma | H04L 41/0631 370/216 |
| 7,039,724 B1 * | 5/2006 | Lavian | H04L 41/0213 707/999.001 |
| 7,124,302 B2 | 10/2006 | Ginter et al. | |
| 7,269,639 B1 * | 9/2007 | Lawrence | H04L 41/0816 709/220 |
| 7,319,693 B2 * | 1/2008 | Chen | H04L 12/2898 370/352 |
| 7,418,593 B2 | 8/2008 | Pettero et al. | |
| 7,552,239 B2 | 6/2009 | Jean et al. | |
| 7,606,225 B2 | 10/2009 | Xie et al. | |
| 7,712,137 B2 | 5/2010 | Meier | |
| 7,735,116 B1 | 6/2010 | Gauvin | |
| 7,818,788 B2 | 10/2010 | Meier | |
| 8,588,226 B2 | 11/2013 | Xie et al. | |
| 2002/0107984 A1 * | 8/2002 | Rawson, III | H04L 29/06 709/246 |
| 2003/0188003 A1 * | 10/2003 | Sylvest | H04L 41/00 709/230 |
| 2006/0075498 A1 * | 4/2006 | Yeom | H04L 63/1416 726/23 |
| 2009/0158428 A1 | 6/2009 | Wang | |
| 2009/0303994 A1 | 12/2009 | Xie et al. | |

* cited by examiner

INTEGRATED SECURITY SWITCH

RELATED APPLICATIONS

This application is a Continuation of U.S. application Ser. No. 13/968,108, filed on Aug. 15, 2013, and issued as U.S. Pat. No. 9,225,683, which is a Continuation of U.S. application Ser. No. 12/539,801, filed on Aug. 12, 2009, and issued as U.S. Pat. No. 8,588,226 on Nov. 19, 2013, which is a Continuation of U.S. application Ser. No. 11/347,279, filed on Feb. 6, 2006, and issued as U.S. Pat. No. 7,606,225 on Oct. 20, 2009, each of which are incorporated herein by reference in their entireties.

FIELD OF THE INVENTION

The present invention relates generally to network connectivity and security. More particularly, the present invention relates to an integrated security switch for improved network connectivity and security.

BACKGROUND OF THE INVENTION

Within the field of networking and internetworking, communications and information traffic continues to grow. Increases to computer processing speeds and enhanced transmission mediums such as optical fiber and Internet-capable cellular phones further add to the amount of potential network traffic. In parallel, increased network traffic corresponds to still further increases in the variety of information moving through the network. Businesses are interconnecting more with each other, with customers, with vendors, with government agencies, and with the public. Two major concerns within such an increasingly busy network are managing the movement of such traffic and ensuring the integrity of information content in terms of connectivity and security. Previous solutions to protecting information assets has included more secure computers and software with virus detection and prevention, firewalls, host and network intrusion detection, encryption, secure host configurations. Such systems, however, suffer from continuous software-patch management, access control and review, penetration testing, and vulnerability assessments. This is a labor intensive and expensive manner of ensuring adequate and timely connectivity and security.

As an evolving alternative to piecemeal approaches to network security, another solution to this growing challenge of includes unified threat management (UTM). UTM de-emphasizes threat avoidance and instead focuses on threat management. Threats to a network are readily apparent outside of almost any firewall. These include a continual stream of low-level network attacks, peppered from time to time with serious break-in attempts by computer hackers and malicious code including virus-infected E-mails. worms, spam, and spyware. UTM devices are typically defined as security appliance products that unify and integrate multiple security features integrated onto a single hardware platform. Further, such UTM devices often include network firewall capabilities, network intrusion detection and prevention, and gateway anti-virus functionality.

Larger enterprises and service providers are typically suitable users for UTM devices due to the centralized nature of such UTM devices. Currently the solution of security and connectivity is addressed by deploying dedicated separate devices, each dedicated to either switching or security. While this is a potential way to solve the problem of implementing a secured network infrastructure, it increases network complexity and administrative overhead. There are also situations when critical traffic required by the security device to determine if network attacks are occurring is "absorbed" by the switch minimizing the effectiveness of the security device.

One example of such a known network 100 is shown by way of FIG. 1 where several users 12 are networked to the Internet via a security device 10 (e.g., a UTM device). Connectivity within such a known network 100 is accomplished via a switch 11 (e.g., a layer 2 router or the like). While such systems can offer cost-effective coordination between organizations and between technologies by streamlining administration and interoperability, certain bundling of key information-security functions and simplified administration remain obstacles to effective unified threat management. Moreover, the rise in blended threats to networking requires a greater breadth of integrated functionality and deployment flexibility. It is, therefore, desirable to provide improved network connectivity and security through integrated security, administration, and networking functions.

SUMMARY OF THE INVENTION

It is an object of the present invention to obviate or mitigate at least one disadvantage of previous UTM devices by introduction of an integrated security switch incorporating layer 2 and/or layer 3 switching characteristics and unified threat management characteristics with a single management interface.

In a first aspect, the present invention provides a method for managing connectivity and security among networks, the method including providing a security function in connection with a first network, providing at least one switching function in connection with a second network, managing the at least one switching function via a management path dedicated between the security function and the at least one switching function, enabling traffic via a traffic path dedicated between the at least one switching function and the security function, the traffic being a flow between the first network and the second network. A network may include one or more devices.

In a further embodiment, there is provided an apparatus for managing connectivity and security among networks, the apparatus including a security function connectable with a first network, at least one switching function connectable with a second network, and a unified interface for managing the at least one switching function via a management path dedicated between the security function and the at least one switching function, wherein the unified interface enables traffic to flow via a traffic path dedicated between the at least one switching function and the security function, the traffic being a flow of data between the first network and the second network.

In further aspect, the present invention provides an integrated security switch for managing connectivity and security among networks, the integrated security switch including a security function connectable with a first network, at least one switching function connectable with a second network, and a common management interface driven by both command line interface and graphic user interface protocols, the common management interface managing the at least one switching function via a management path dedicated between the security function and the at least one switching function. and enabling traffic to flow via a traffic path dedicated between the at least one switching function and the security function, the traffic being a flow of data between the first network and the second network.

Other aspects and features of the present invention will become apparent to those ordinarily skilled in the art upon review of the following description of specific embodiments of the invention in conjunction with the accompanying figures.

DETAILED DESCRIPTION

Generally, the present invention provides a method and apparatus for integrating security functionality of a UTM device with both Layers 2 and 3. (i.e., "Layer 2/3") switching functionality with a single management interface. Layer 2 switching functionality pertains to the data-link layer within the standard seven-layer model of networking. Layer 2 switches operate using physical network addresses that identify individual hardware devices. Such addresses are permanently assigned during the manufacturing process whereby switches operating at Layer 2 are very fast because they simply sort physical addresses without examining data packets. Layer 3 switching functionality pertains to the network layer of the standard networking model. Layer 3 switches use network or Internet protocol (IP) addresses that identify locations on the network and read network addresses more closely than Layer 2 switches. Layer 3 switches identify network locations as well as the physical device where such location can be a local are network (LAN) workstation, a location in a computer's memory, or even a different packet of data traveling through a network. Switches operating at Layer 3 have more computing intelligence than Layer 2 devices and incorporate routing functions to actively calculate the best way to send a packet to its destination. However, such computing intelligence includes algorithms and processors that can of course slow switching functions relative to Layer 2 devices. Embodiments of the present invention will now be described, by way of example only, with reference to the attached FIGS. 2 through 4.

Figure 1:
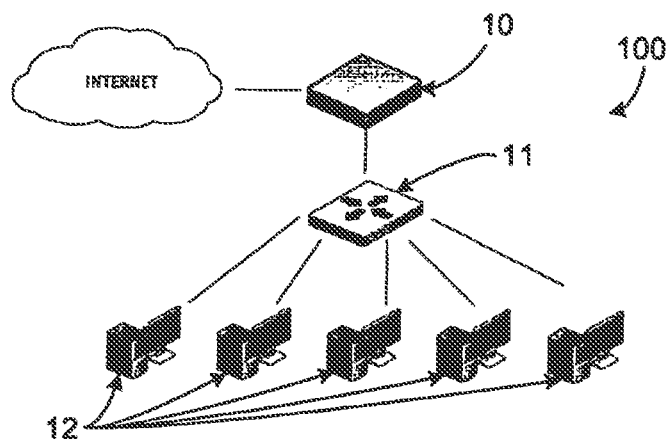
FIG. 1 is a simplified illustration of a network having a known arrangement of security device and network switching element.
Figure 2:
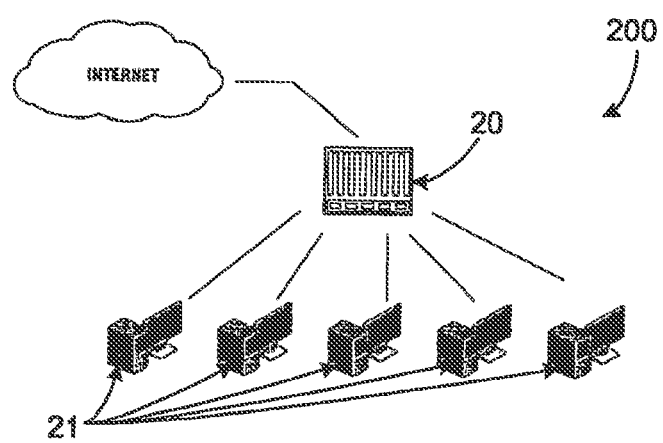
FIG. 2 is a simplified illustration of a network having an Integrated security switch in accordance with the present invention.

With reference to FIG. 2, a simplified illustration of a network 200 is shown having several users 21 networked to the Internet through an integrated security switch 20 in accordance with the present invention. The network 200 may be any type of arrangement including, but not limited to, a corporate intranet, public Internet service provider system, or small-scale network of personal computers such as a home office network. The integrated security switch presents each user 21 of the network with a unified management interface such that connectivity and security features are seamless and transparent to the user 21. The unified management interface is embodied within software that can be driven by command line interface (CLI) and graphic user interface (GUI) implementations in order to provide combined computer network Layer 2/3 switch connectivity and multi-function security features. While CLI and GUI are preferably implementations, it should be understood that other software implementations may be possible without straying from the intended scope of the present invention.

The unified management interface software may reside in a unit including a central processing unit (CPU) and storage (i.e., memory) having resources to run its own internal web-server. The unified management interface may be accessible via a closed network or via the Internet The unified management interface reduces management overhead and network complexity. Moreover, the unified management interface facilitates increased internal network security allowing the security functions to be implemented with a more granular approach where individual security policies and/or profiles to each individual port are defined and which, in turn, typically map directly to users. It should be noted that the instant inventive approach differs from a typical firewall/content security-only device that is normally implemented at the network perimeter where one cannot typically map security policies to individual users except when they attempt to traverse the perimeter. The Inventive unified management interface provides the ability to create one single instance of a management interface that controls both the switching and security features.

The integrated security switch 20 as shown in FIG. 2 includes two main hardware modules—a security module and switch module. Such are further shown in a first embodiment within FIG. 3. Within the integrated security switch 20a shown in FIG. 3, security module 300 is connected to switch module 301 via a management path 32 for management of communications and a traffic path 34 for transmission of the actual communications. While only one of each such path 32, 34 are shown, it should be understood that mote than one of each such paths may exist without straying from the intended scope of the present invention depending upon the given network requirements (e.g. user capacity).

Figure 3:
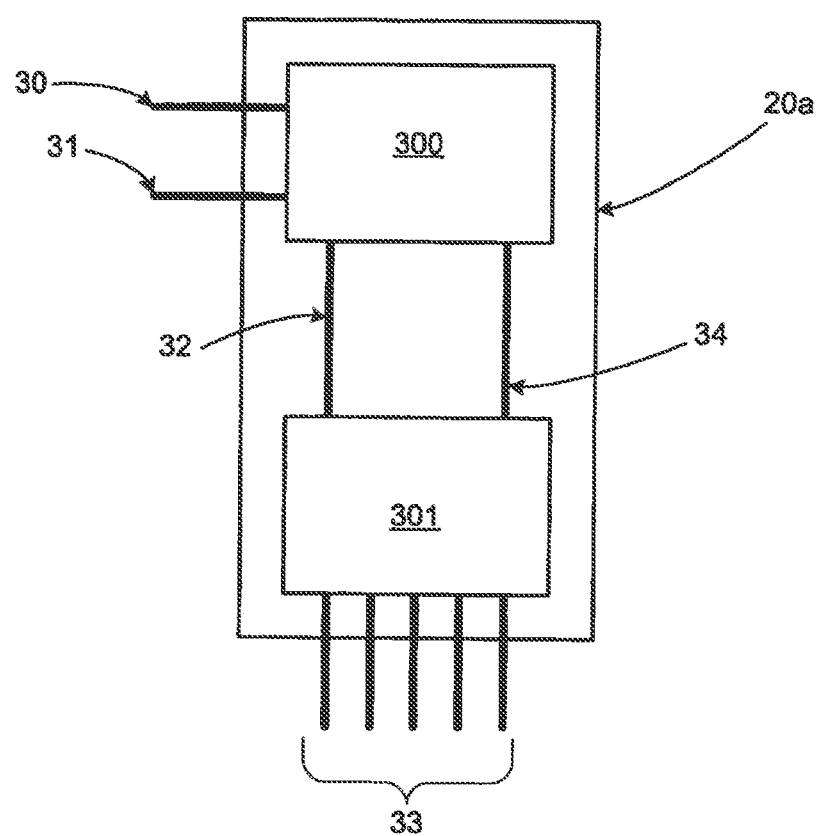
FIG. 3 is a block configuration of an integrated security switch in accordance with a first embodiment of the present invention.

With further reference to FIG. 3, external communications connections 30 and 31 are shown for linkage of the integrated security switch 20a to the Internet or other networks. Further, switch ports 33 (e.g., Ethernet ports) are shown for linkage of the integrated security switch 20a to user devices (e.g., personal computers) and/or further networks (e.g., home network). The management path 32 and a traffic path 34 facilitate traffic flow and management operations between both modules 300, 301. The security module 300 provides the security functions for traffic Inbound from the switch module 301 as well as the additional external communications connections 30, 31. These security functions include, but are not limited to, firewall, antivirus, intrusion protection/detection, content filtering, antispam, and virtual private networking (VPN). The switch module 301 provides access to multiple network devices through the switch ports 33 and implements typical switching functions. Such switching functions include features such as, but not limited to, Ethernet connectivity (10/10/1000), virtual-LAN (VLAN) and VLAN trunking, virtual interfaces, spanning tree protocol (including variances), internet group management protocol (IGMP) snooping, Layer 2 switching, Layer 3 switching, and generic attribute registration protocol (GARP).

Physical implementations of the integrated security switch 20a shown in FIG. 3 involve housing the security module 300 and the switch module 301 in a common casing. The modules 300, 301 are connected internally via appropriate circuitry comprising the traffic path 34 that allows traffic incoming from the switch module 301 to be sent to the security module 300 for processing. As well, the modules 300, 301 are connected internally via appropriate circuitry comprising the management path 32 that is used to provide management functions between both modules 300, 301. It should be understood that additional communications paths may be available on the security module 300 to allow direct connections to devices as required. Such devices may be, but are not limited to, connected computers, external printers, or any other type of communications device. Such direct connections would not require the use of VLANs.

In operation, the integrated security switch 20*a* of the present invention is based on defining security features for traffic that flows within the given network. Traffic is received and transmitted on the physical interfaces within the Integrated security switch 20*a*. Security features are logically grouped together and applied between communicating interfaces. These interfaces consist of both physical interfaces within the given network, and virtual interfaces that are assigned to a logical grouping of physical interfaces (e.g., a VLAN). In other words, one can logically "group" multiple physical switch ports together as VLANs so as to allow multiple devices to "talk" together in a "closed" group. Such communication is accomplished by using Virtual Interfaces for each VLAN. For example: Ports 1,2,3,4,5 could be assigned to VLAN "10", while ports 6,7,8,9 could be assigned to VLAN "20". In this example, ports within VLAN 10 can communicate with each other, but not any ports in VLAN 20 (and vice-versa). To allow ports in VLAN 10 and VLAN 20 to communicate to each other, each VLAN must be assigned a "Virtual Interface" (VI). This VI is a non-physical interface, but is treated as an interface by the system as is common practice in the art of Layer 2/3 switching. The present invention allows the switch's 20*a* VI to be presented to the security module 300 so that security policies can be defined between VLANs. While VLANs are mentioned herein, the present invention may be implemented with alternate security features that do not rely on VLAN VIs.

Traffic that is transmitted between interfaces that has an assigned feature grouping will be transmitted to the security module 300 for processing. Traffic that is transmitted between interfaces that does not have an assigned grouping of features will be forwarded from the switching module 301 without being processed via the security module 300.

Figure 4:
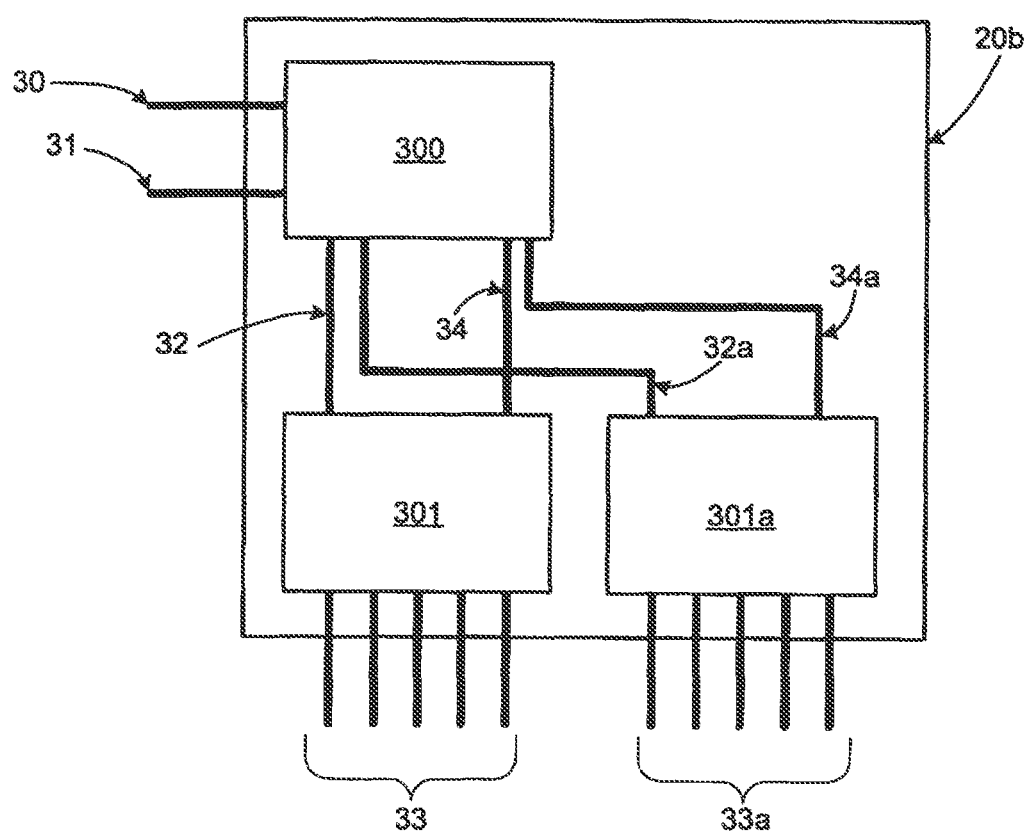
FIG. 4 is a block configuration of an integrated security switch in accordance with a second embodiment of the present invention.

It should be understood that the present invention is scalable for a variety of networking applications. For instance, multiple LANs can be supported by an integrated security switch of the present invention that includes segmented switching functions. While FIG. 3 shows a logical representation of the present invention with one security module and one switch module as discussed above, it is feasible that multiple switch modules could be supported by one security module. Such a logical representation of a second embodiment of the present invention with one security module and two switch modules is shown in FIG. 4. In either the embodiment, module integration is accomplished using available chipset communications links. Although separate modules are shown within either FIG. 3 or 4, this should be considered as merely illustrative of the logical representation such that a single hardware layout is one possible implementation. Still further, multiple switching modules should be understood to be illustrative of the fact that the present invention should not be limited by the amount of physical ports in a given implementation.

With specific further reference to FIG. 4, the second embodiment of the integrated security switch 20*b* in accordance with the present invention is illustrated. The integrated security switch 20*b* again includes a security module 300 connected to switch module 301 via a management path 32 for management of communications and a traffic path 34 for transmission of the actual communications. However, a second switch module 301*a* is included with connected to the security module 300 via a second management path 32*a* for management of communications and a second traffic path 34*a* for transmission of the actual communications. While only two switch modules 301, 301*a* are shown, it should be understood that more than one module or functional equivalent of such (i.e., multiple logical modules) are possible without straying from the intended scope of the present invention.

Similar to FIG. 3, FIG. 4 illustrates external communications connections 30 and 31 are shown for linkage of the integrated security switch 20*b* to the Internet or other networks. Further, switch ports 33 and 33*a* (e.g., Ethernet ports) are shown for linkage of the integrated security switch 20*b* to user devices (e.g., personal computers) and/or further networks (e.g., home network). The management paths 32, 32*a* and a traffic path 34, 34*a* facilitate traffic flow and management operations between security module 300 and switch modules 301. 301*a*. The security module 300 provides the security functions for traffic inbound from the switch modules 301, 301*a* as well as the additional external communications connections 30, 31.

In either embodiment discussed above in regard to the figures, users will be presented with one common management interface (both command line interface (CLI) driven and graphic user interface (GUI) driven) that will allow them to control the behavior of both the security features and the switching features. All such features are seamlessly integrated into one management interface. For example, a user would be enabled to manage an integrated security switch that provides 26×10/100 Ethernet ports (2 of which may be dedicated to WAN traffic (ISP)), 2 GigE ports. In practice, commands presented to the management interface are divided into two separate items including commands to configure the security module and commands to configure the switching module(s). The latter being "translated" from the former into appropriate commands. In this manner, all management commands are accepted at the security module with translation into commands used by the switching module being transparent to the user. This approach could further increase flexibility with regards to network connectivity and security.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A method for managing connectivity and security among networks, said method comprising:
   providing a security function in connection with a first network;
   providing at least one switching function in connection with a second network;
   managing, via a unified interface, the at least one switching function via a physical management path dedicated between the security function and the at least one switching function;
   enabling, via the unified interface, traffic via a traffic path dedicated between the at least one switching function and the security function, said traffic being a flow between said first network and said second network;

grouping, via the unified interface, one or more switching functions into a group comprising a virtual interface, wherein the virtual interface provides communication of the one or more switching functions within the group;

grouping, via the unified interface, a second set of one or more switching functions, the of one or more switching functions distinct from the of one or more switching functions, into a second group comprising a second virtual interface, wherein the second virtual interface provides communication of the second set of one or more switching functions within the second group;

determining the security policy between the virtual interface and the second virtual interface; and responsive to a determination that security policy allows communication between the virtual interface and second virtual interface, allowing communication between the virtual interface and second virtual interface.

2. The method of claim 1 wherein, the virtual interface is a non-physical interface.

3. The method of claim 1 wherein the determination of the security policy further comprises receiving the security policy from a security module.

4. The method of claim 1, wherein the unified interface is one common management interface driven by both command line interface and graphic user interface protocols.

5. The method of claim 1, wherein:
the first network comprises the Internet; and
the second network comprises a local area network.

6. An apparatus for managing connectivity and security among networks, the apparatus comprising:
a security function connectable with a first network;
at least one switching function connectable with a second network and at least one security function connectable with the second network;
a unified interface for managing the at least one switching function via a physical management path dedicated between the security function and the at least one switching function and for managing at least one additional switching function via at least one additional corresponding management path; and
a virtual interface for grouping, via the unified interface, one or more switching functions into a group, wherein the virtual interface provides communication of the one or more switching functions within the group,
wherein the unified interface enables traffic to flow via a physical traffic path dedicated between the at least one switching function and the security function and dedicated between the at least one additional security function and the at least one additional switching function, the traffic being a flow of data between the first network and the second network;
group, via the unified interface, a second set of one or more switching functions, the of one or more switching functions distinct from the of one or more switching functions, into a second group comprising a second virtual interface, wherein the second virtual interface provides communication of the second set of one or more switching functions within the second group;

determine the security policy between the virtual interface and the second virtual interface; and responsive to a determination that security policy allows communication between the virtual interface and second virtual interface, allow communication between the virtual interface and second virtual interface.

7. The apparatus of claim 6 wherein, the virtual interface is a non-physical interface.

8. The apparatus of claim 6 wherein the determination of the security policy further comprises receiving the security policy from a security module.

9. The apparatus of claim 6, wherein the unified interface is one common management interface driven by both command line interface and graphic user interface protocols.

10. The apparatus of claim 6, wherein:
the first network comprises the Internet; and
the second network comprises a local area network.

11. A non-transitory computer-readable medium storing computer source code that, when executed by a processor, performs a method for managing connectivity and security among networks, the method comprising:
providing a security function in connection with a first network;
providing at least one switching function in connection with a second network;
managing, via a unified interface, the at least one switching function via a physical management path dedicated between the security function and the at least one switching function;
enabling, via the unified interface, traffic via a traffic path dedicated between the at least one switching function and the security function, said traffic being a flow between said first network and said second network;
grouping, via the unified interface, one or more switching functions into a group comprising a virtual interface, wherein the virtual interface provides communication of the one or more switching functions within the group;
grouping, via the unified interface, a second set of one or more switching functions, the of one or more switching functions distinct from the of one or more switching functions, into a second group comprising a second virtual interface, wherein the second virtual interface provides communication of the second set of one or more switching functions within the second group;
determining the security policy between the virtual interface and the second virtual interface; and
responsive to a determination that security policy allows communication between the virtual interface and second virtual interface, allowing communication between the virtual interface and second virtual interface.

\* \* \* \* \*